United States Patent
Grossberndt et al.

Patent Number: 6,113,331
Date of Patent: Sep. 5, 2000

[54] SELF TAPPING SCREW FOR SCREWING INTO THERMOPLASTICS AND THE LIKE

[75] Inventors: Herman Grossberndt; Gottfried König, both of Bad Laasphe, Germany

[73] Assignee: EJOT Verbindungstechnik GmbH & Co. KG, Germany

[21] Appl. No.: 09/269,473

[22] PCT Filed: Jul. 28, 1998

[86] PCT No.: PCT/EP98/04720

§ 371 Date: Jun. 21, 1999

§ 102(e) Date: Jun. 21, 1999

[87] PCT Pub. No.: WO99/06719

PCT Pub. Date: Feb. 11, 1999

[30] Foreign Application Priority Data

Jul. 29, 1997 [DE] Germany .......................... 197 32 615
Nov. 11, 1997 [DE] Germany .......................... 197 49 845

[51] Int. Cl.$^7$ ................................................. F16B 35/04
[52] U.S. Cl. ........................................ 411/411; 411/387.4
[58] Field of Search .................................. 411/411, 413, 411/423, 386, 387.4

[56] References Cited

U.S. PATENT DOCUMENTS

| | | | |
|---|---|---|---|
| 2,742,074 | 4/1956 | Rosan | 411/411 |
| 3,726,330 | 4/1973 | Adler . | |
| 3,748,949 | 7/1973 | Dreger | 411/411 |
| 4,544,313 | 10/1985 | Grossberndt . | |

FOREIGN PATENT DOCUMENTS

| | | | |
|---|---|---|---|
| 104 552 | 4/1984 | European Pat. Off. . | |
| 589 399 | 3/1994 | European Pat. Off. . | |
| 2500090 | 8/1982 | France | 411/411 |
| 39 26 000 | 8/1990 | Germany . | |
| 1580356 | 12/1980 | United Kingdom | 411/411 |

*Primary Examiner*—Flemming Saether
*Attorney, Agent, or Firm*—Banner & Witcoff, Ltd.

[57] ABSTRACT

A retaining screw produced by cold rolling includes a self tapping thread designed to be screwed into thermoplastic material or the like. The screw has a virtually end-to-end cylindrical thread as well as thread teeth, the thread crest of which has the same height on the whole length, while the free space between two teeth remains the same all along the thread The screw presents the following characteristics: either 1) the thread outer diameter Do and the thread inner diameter Dk represent the ratio $Q_1=Do/Dk$, in a magnitude of 1.2 to 1.4; 2) the axial distance P between two thread teeth gives with the height H of the latter a ratio $Q2=P/H$, in a magnitude of 2.75 to 2.9; 3) the point angle of the thread teeth is about 30°; or 1) the thread outer diameter Do and this thread inner diameter gives a ratio $Q1=Do/Dk$, in a magnitude of 1.25 to 1.65; 2) the axial distance P between two thread teeth gives with the height H of the latter a ratio $Q2=P/H$, in a magnitude of 2.35 to 2.7; 3) the point angle of the thread teeth is about 30°.

2 Claims, 1 Drawing Sheet

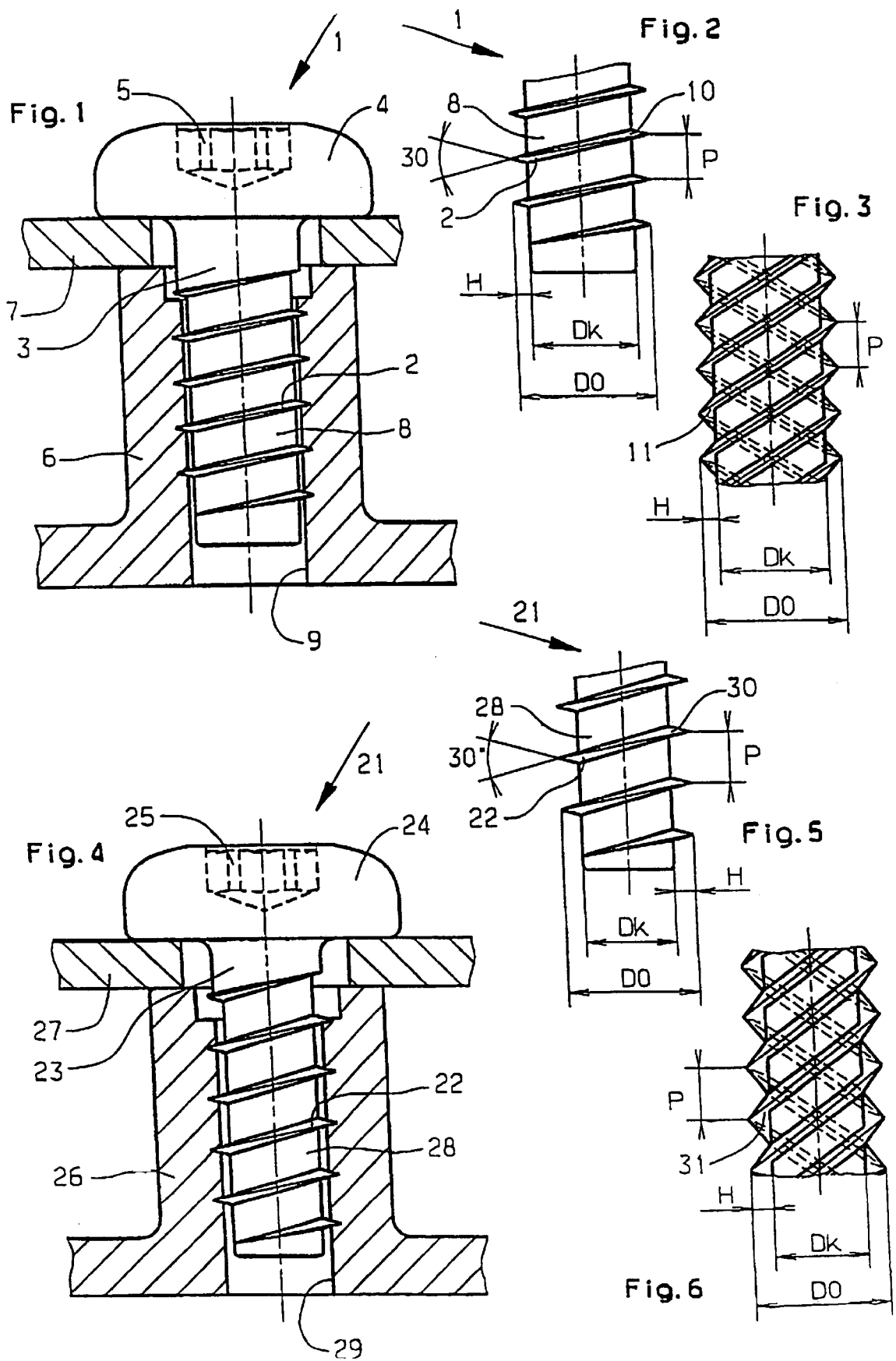

SELF TAPPING SCREW FOR SCREWING INTO THERMOPLASTICS AND THE LIKE

FIELD OF THE INVENTION

The invention relates to a screw, formed by cold rolling, with a self-tapping single-flight thread, for screwing, in particular, into thermoplastics, with an essentially continuously cylindrical thread bottom and with thread teeth which have a vertex of continuously equal height, the free spaces between adjacent thread teeth being made the same along the thread.

BACKGROUND AND SUMMARY OF THE INVENTION

A screw of this type is known from German patent specification 39 26 000. This screw, regarding which the patent specification expressly points out that it is particularly suitable for setting and adjusting devices, that is to say for so-called movement threads, is to have a high-quality thread, by means of which a continuous and exactly meterable screw-in torque can be achieved. The outlay in terms of forming during the production of the screw by cold rolling is, at the same time, to be lower than in the case of conventional types of screw. In order to achieve this object, the screw possesses a vertex angle of about 40°, thus making it easier for the screw material to flow during the cold-rolling process.

The present invention is to provide a screw which, in contrast to the action of a movement thread, is particularly suitable for screwing, in particular, into thermoplastics for fastening purposes. When screws of this type are screwed into plastic, the latter is displaced by the thread teeth penetrating into the plastic, for which purpose the thread cross section must make sufficient free space available. During this time, the plastic displaced by the thread teeth is squeezed into this free space. In this case, German patent specification 27 54 870, column 2, paragraph 1, started from the idea of penetrating as deep as possible into the respective plastic workpiece (high bearing depth), for which purpose, in the case of a flank angle of about 30°, a correspondingly large free space must then be made available. To this effect, in the screw according to German patent specification 27 54 870, the thread bottom has a contraction, so that a correspondingly large free space is available for the plastic displaced by the thread teeth. In this case, the plastic displaced by the thread teeth has to cover, from the region of the thread tooth which is penetrated into the plastic, into the thread bottom, a distance over which the displaced plastic loses the direct intimate bond with the non-displaced plastic due to the length of this distance, thus making the said displaced plastic less capable of contributing to the pull-out force. The term "pull-out force" refers to the force necessary for tearing out the screwed-in screw. However, a large free space for receiving displaced plastic results in a correspondingly small thread-bottom diameter (core diameter), and a consequence of this may be that, when such a screw is screwed in, in particular when it is screwed in over a relatively large number of thread flights, it is overloaded by the torque acting on it and breaks off.

The idea of displacing the plastic is also of primary importance in the design of the screw according to European patent specification 0,589,399. This screw, which is designed expressly for a high bearing depth of the thread flanks, is to achieve a material displacement such that the material is compacted on the thread flanks, specifically on those flanks which, as so-called load flanks, have to absorb tear-out forces acting on the screw. In order to influence the flow of material in this way, the screw possesses a conical thread bottom, the smaller core diameter of which is adjacent to the said load flank. The flow of the plastic is thereby to be directed towards the load flank, where the plastic is then to be compacted. This intended flow of plastic presupposes that the material is sufficiently heated and converted into flow and solidification, while the screw is being screwed in. The design of the known screw is therefore based on considerably softening, shifting and compacting the plastic while the screw is being screwed in, as a result of which the plastic is completely released from its original bond and its structure is changed. As a consequence of this, the load flanks of the screws have to be supported on this material which has been changed in such a way, but precisely this leads to a reduction in the tear-out forces of a screw thus screwed in.

The present invention departs from the idea, prevalent hitherto in the prior art, of the thread teeth penetrating as deep as possible into the plastic, which, at first sight, seems plausible in order to achieve high tear-out forces. For this purpose, according to a first variant, the following dimensioning may be used:

1. the outside diameter Do and the core diameter Dk of the thread form a quotient Q1=Do/Dk of a magnitude of 1.2 to 1.4;
2. the axial spacing P of adjacent thread teeth forms, with the height H of the thread teeth, a quotient Q2=P/H which is between 2.75 and 2.9;
3. the vertex angle of the thread teeth is about 30°.

This dimensioning leads to the screw having relatively low thread teeth, so that the screw sits in the plastic with a relatively low depth of penetration. The advantage of this is that the structure of the displaced plastic is not impaired to any considerable extent. In order to achieve high tear-out forces in spite of the relatively low depth of penetration, the thread is produced with a relatively low pitch, so that a large number of thread flights engaged with the plastic are provided.

According to a second variant, the following dimensioning may also be used:

1. the outside diameter Do and the core diameter Dk of the thread form a quotient Q1=Do/Dk of a magnitude of 1.25 to 1.65;
2. the axial spacing P of adjacent thread teeth forms, with the height H of the thread teeth, a quotient Q2=P/H which is between 2.35 and 2.7;
3. the vertex angle of the thread teeth is about 30°.

This latter dimensioning has, in addition, the following effect: the core diameter possesses a dimension which makes it possible to take into account the forming behaviour of a respective screw blank during its production by rolling, specifically in that the height of the thread teeth, which is building up on the core diameter, is still sufficiently large to displace the material of the screw in an advantageous way, in the region between the thread teeth, during rolling by the pressure exerted on the blank and, consequently, to produce accurately shaped thread teeth which, on the one hand, also have the advantage that they do not impair the plastic when they penetrate into it, but still have a height such that they can be shaped with considerable accuracy during rolling.

So that these effects, made possible by the dimensionings explained above, can be fully utilized, the screw according to the invention possesses a vertex angle of the thread which is about 30°.

A vertex angle of this kind for screws to be screwed into plastic is known per se, as shown, for example, by German patent specification 27 54 870. The aim, with this screw, is to make a relatively large free space between the thread flights available for the plastic into which the screw is screwed. The tendency followed by this screw amounts, therefore, to displacing as much plastic as possible by means of the thread teeth, that is to say, to working with a high depth of penetration, in order thereby to achieve high tear-out forces. The teachings of this patent specification do not therefore suit the prior art defined by German patent specification 39 26 000, since this prior art, apart from its particular suitability for movement threads, when it is applied to plastic screws, amounts to displacing as little plastic as possible with these screws.

The combination of the dimensioning features relating to the height and spacing of the thread teeth with the use of a particularly small vertex angle known per se results in a reinforcement of the principle of displacing as little plastic as possible when the screw is screwed into plastic, since the plastic mass to be displaced on account of the small vertex angle of 30° is substantially smaller than in the case of a vertex angle of 40°, as emerges from German patent specification 39 26 000, the result of this being that the interspace existing between the thread flights, this being defined by the pitch of the thread, can be kept shorter, the consequence of this being that the number of thread flights to be anchored in a plastic part is increased correspondingly, if the screw-in length remains the same. This then leads to correspondingly increased tear-out forces.

High tear-out forces necessitate a corresponding load-bearing capacity of the screws both in the axial and in the tangential direction. The thinner the cross section of the screw relative to its outside diameter, the greater is the load on the screw, in relation to its cross section, both when it is being screwed in and when it is being tightened. So that, in this case, high tear-out forces car be withstood, it has hitherto been necessary for the screw material used for the known screws to have very high strength, the result of this being that highly tempered materials have had to be used for the screws in question here, these materials, on the one hand, being costly and, on the other hand, reacting sensitively to embrittlement occurring due to hydrogen diffusion. The consequence of this known effect may be that, in the known firmly tightened screws made of highly tempered material, time-delayed brittle fractures occur after they have been screwed in and tightened, for example by their heads splitting off after a few days. The screw dimensioning according to the invention provides screws having a relatively large cross section in relation to their outside diameter (as, for example, a look at FIG. 1 clearly shows). The screws according to the invention, by virtue of their design over their cross section, can therefore absorb considerably higher torques and axial forces than has been possible hitherto. This affords the possibility of producing the screw according to the invention from a material which has lower strength, as compared with conventional screws, that is to say materials can be used which, because of lower tempering, do not have the tendency to absorb hydrogen by diffusion and are therefore inclined to brittle fractures.

BRIEF DESCRIPTION OF THE DRAWINGS

Exemplary embodiments of the invention are illustrated in the figures.

Of these:

FIG. 1 shows a fastening screw screwed into a tube, for fastening a plate according to the first variant, FIG. 2 shows a detail of the single-flight thread of the screw according to FIG. 1 in an enlarged illustration, FIG. 3 shows a detail of a two-flight thread, FIG. 4 shows a fastening screw screwed into a tube, for fastening a plate according to the second variant, FIG. 5 shows a detail of the single-flight thread of the screw according to FIG. 1 in an enlarged illustration, FIG. 6 shows a detail of a two-flight thread.

DETAILED DESCRIPTION OF THE PREFERRED EMBODIMENTS

FIG. 1 shows a screw 1, formed by cold rolling, with the self-tapping thread 2 which extends uniformly over the shank 3. On that side of the screw 1 which is locates opposite the end of the shank 3, the said screw possesses the screw head 4 which is provided, here, with a profiled recess 5 for the insertion of a suitable spanner, by means of which the screw 1 is screwed into a workpiece, here the tube 6. The screw 1 serves for fastening the plate 7 to the tube 6. For this purpose, the screw is tightened relative to the tube 6 in such a way that its head 4 at the same time presses the plate 7 against the tube 6.

The particular feature of the fastening screw 1 according to the invention can be seen clearly from FIG. 1, specifically its relatively low depth of penetration into the material of the tube 6 and, as compared with this, the relatively large core diameter Dk of the thread 2, the continuously cylindrical thread bottom 8 of which leaves only a relatively small free space relative to the inner face 9 of the tube 6.

FIG. 2 illustrates a detail of the shank 3 according to FIG. 1 in an enlarged illustration. This detail illustrates the core diameter Dk, the outside diameter Do and the axial spacing P and the height H of the thread teeth 10. Moreover, the flank angle of the thread teeth is specified as 30° in FIG. 2.

It may be gathered from FIG. 2 that, in the screw, illustrated enlarged, the quotient Q1=Do/Dk is 1.3. here [sic], the quotient Q2=axial spacing P/height H has the value 2.85.

FIG. 3 illustrates a detail of a two-flight thread 11 which, apart from the number of flights, is otherwise largely identical to the thread 2 according to FIG. 2. The axial spacing P in the thread 11 according to FIG. 3 is measured, here, between the two adjacent thread teeth of the one thread flight and of the other. This results, as in the exemplary embodiment according to FIG. 1, in the quotient Q2=axial spacing P/height H with a value of 2.85.

The fastening screws illustrated in FIGS. 1 and 2 are those which are usually produced with an outside diameter of 1 mm to 10 mm. The screw according to the invention is suitable for screwing not only into the currently customary thermoplastics, but also into all other materials which have properties similar to those of thermoplastics.

FIG. 4 shows a screw 21, formed by cold rolling, with the self-tapping thread 22 which extends uniformly over the shank 23. On that side of the screw 21 which is located opposite the end of the shank 23, the said screw possesses the screw head 24 which is provided, here, with a profiled recess 25 for the insertion of a suitable spanner, by means of which the screw 21 is screwed into a workpiece, here the tube 26. The screw 21 serves for fastening the plate 27 to the tube 26. For this purpose, the screw is tightened relative to the tube 26 in such a way that its head 24 at the same time presses the plate 27 against the tube 26.

The particular feature of the fastening screw 21 according to the invention can be seen clearly from FIG. 4, specifically its relatively low depth of penetration into the material of the tube 26 and, as compared with this, the relatively large core diameter Dk of the thread 22, the continuously cylindrical thread bottom 28 of which leaves only a relatively small free space relative to the inner face 29 of the tube 26.

FIG. 5 illustrates a detail of the shank 23 according to FIG. 4 in an enlarged illustration. This detail illustrates the core diameter Dk, the outside diameter Do and the axial spacing 4 and the height H of the thread teeth 30. Moreover, the flank angle of the thread teeth is specified as 30° in FIG. 5.

It may be gathered from FIG. 5 that, in the screw, illustrated enlarged, the quotient Q1=Do/Dk is 1.46. Here, the quotient Q2=axial spacing P/height H has the value 2.48.

FIG. 6 illustrates a detail of a two-flight thread 31 which, apart from the number of flights, is otherwise largely identical to the thread 22 according to FIG. 5. The axial spacing P in the thread 31 according to FIG. 6 is measured, here, between the two adjacent thread teeth of the one thread flight and of the other. This results, as in the exemplary embodiment according to FIG. 4, in the quotient Q2=axial spacing P/height H with a value of 2.48.

The fastening screws illustrated in FIGS. 4 and 5 are those which are usually produced with an outside diameter of 1 mm to 10 mm. The screw according to the invention is suitable for screwing not only into the currently customary thermoplastics, but also into all other materials which have properties similar to those of thermoplastics.

For soft plastics, a screw according to the invention is particularly suitable, in which, within the latitude of variation of the flank angle of approximately 30°, a value is selected which leads to particularly pointed thread flights, specifically with a flank angle of approximately 25°.

What is claimed is:

1. Fastening screw (1), formed by cold rolling, with a self-tapping thread (2, 11) for screwing into thermoplastics, and materials which have properties similar to those of thermoplastics with an essentially continuously cylindrical thread bottom (8) and with thread teeth (10) which have a vertex of continuously equal height, the free spaces between adjacent thread teeth (10) being made the same along the thread (2, 11), characterized by the combination of the following features,
   1. the outside diameter Do and the core diameter Dk of the thread form a quotient Q1=Do/Dk of a magnitude of 1.2 to 1.4;
   2. the axial spacing P of adjacent thread teeth forms, with the height H of the thread teeth, a quotient Q2=P/H which is between 2.75 and 2.9; and
   3. the vertex angle of the thread teeth is about 30°.

2. Fastening screw (21) formed by cold rolling with a self-tapping thread for screwing into thermoplastics and materials which have properties similar to those of thermoplastics with an essentially continuously cylindrical thread bottom and with thread teeth which have a vertex of continuously equal height, the free spaces between adjacent thread teeth being made the same along the thread, characterized by the combination of the following features,
   1. the outside diameter Do and the core Diameter Dk of the thread form a quotient Q1=Do/Dk of a magnitude of 1.25 to 1.46;
   2. the axial spacing P of adjacent thread teeth forms, with the height H of the thread teeth, a quotient Q2=P/H which is between 2.35 and 2.7; and
   3. the vertex angle of the thread teeth is about 30°.

* * * * *